March 16, 1965 A. R. DUNN 3,173,639
CABLE HOLDER AND METHOD OF MANUFACTURE
AND INSTALLATION THEREOF
Filed Oct. 12, 1962
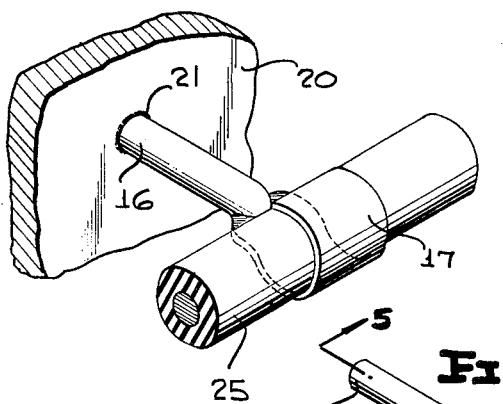
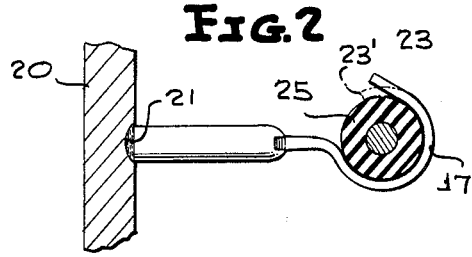
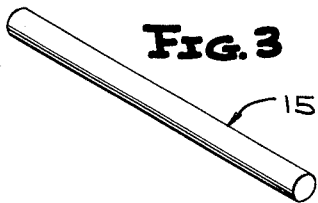
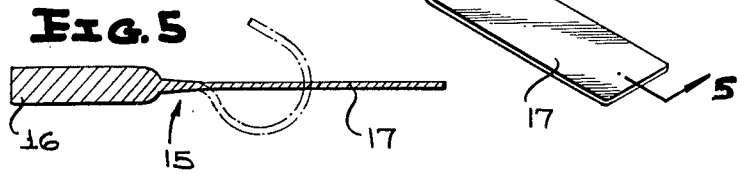
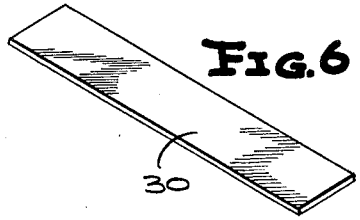
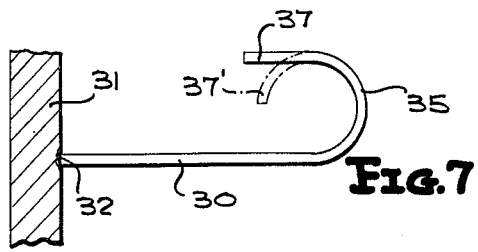
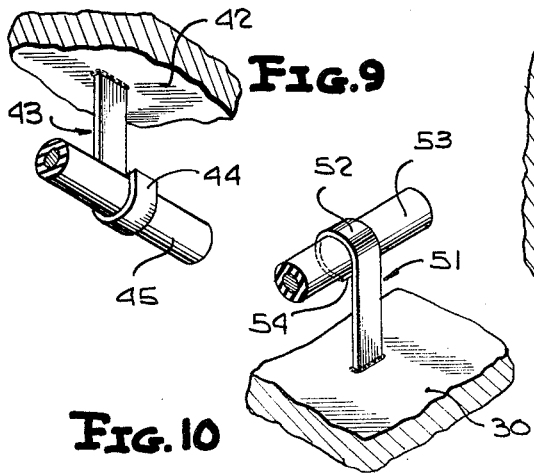
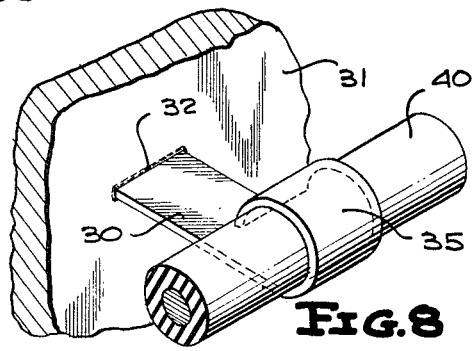
INVENTOR.
ALLEN R. DUNN
BY
Shoemaker and Mattare
ATTORNEYS A United States Patent Office 3,173,639
Patented Mar. 16, 1965

3,173,639
CABLE HOLDER AND METHOD OF MANUFACTURE AND INSTALLATION THEREOF
Allen R. Dunn, Hampton, Va., assignor to Newport News Shipbuilding and Dry Dock Company, Newport News, Va.
Filed Oct. 12, 1962, Ser. No. 230,190
1 Claim. (Cl. 248—65)

The present invention relates to a new and novel cable holder and method of manufacture and installation thereof which is particularly adapted for supporting single cables in installations such as ships, wherein it is desired to mount the cable holders on metallic bulkheads, decks, and the like.

The cable holder of the present invention is especially adapted for mounting upon metallic surfaces as are commonly encountered in shipboard applications and the like. Accordingly, the cable holder is specifically intended to be mounted in position by means of a stud welding gun employing electric arc welding techniques. This is a preferable way of accomplishing the mounting of the cable holders since it provides a very efficient and effective way of mounting and supporting the cable holder in position, and additionally can be carried out in a very expeditious manner.

The cable holder according to the present invention is of such a construction that it can be readily mounted in position by means of conventional stud welding guns. Additionally, the cable holders of the present invention represent the ultimate in simplicity in construction, and yet at the same time provide a construction which is quite sturdy and reliable in use.

A novel method is employed for making a cable holder according to the present invention, and in addition a unique method of mounting the cable holder and supporting the cable therein is provided. According to this latter method, the cable holder is mounted in operative position and by welding with a conventional stud welding gun. The cable holder is provided with a deformable support end portion which is adapted to receive a cable, and this deformable support end portion may be given an arcuate configuration either before welding the cable holder in operative position on the support means or subsequent to welding the cable holder in operative position.

At any rate, once the cable holder is welded in position on the support means with the outer deformable end portion thereof in arcuate configuration, a cable is placed in position within this arcuate outer end portion. The terminal end of the deformable outer end portion is then finally bent or crimped into operative position so as to retain and actually effectively lock the cable in place therein such that there is no possibility of the cable's accidentally being released from the cable holder.

An object of the present invention is to provide a new and novel cable holder which is particularly adapted for use on ships or other installations having metallic surfaces upon which it is desired to mount the cable holders and thereby support the cables.

Another object of the invention is to provide a cable holder which represents the ultimate in simplicity and yet which is quite sturdy and reliable in use.

A still further object of the invention is to provide a new and improved method of making a cable holder.

Yet another object of the invention is the provision of a simple and expeditious method of installing cable holders and mounting associated cables in supported position within the cable holders.

Other objects and many attendant advantages of the invention will become more apparent when considered in connection with the specification and accompanying drawing, wherein:

FIG. 1 is a broken-away perspective view illustrating a cable holder according to the present invention with a cable supported therein;

FIG. 2 is a vertical section through the arrangement as shown in FIG. 1;

FIG. 3 illustrates a substantially cylindrical member employed for forming a cable holder according to the present invention;

FIG. 4 illustrates a step in the formation of a cable holder from the member shown in FIG. 3;

FIG. 5 is a sectional view taken substantially along line 5—5 of FIG. 4 looking in the direction of the arrows and illustrating in phantom lines the manner in which the flattened support end portion thereof is bent into an arcuate configuration;

FIG. 6 is a perspective view of a flat bar-like member employed for making a modified form of cable holder according to the present invention;

FIG. 7 is a sectional view illustrating the manner in which the member of FIG. 6 is mounted in operative position upon a support means;

FIG. 8 is a broken away perspective view illustrating the cable holder as shown in FIG. 7 with a cable operatively supported therein;

FIG. 9 is a broken away perspective view illustrating the manner in which the cable holder can be utilized more or less as a hanger for restraining a cable therein; and FIG. 10 is a view illustrating the manner in which the cable holder can be supported upon the deck of a ship or upon any suitable horizontal supporting surface while still retaining a cable in operative position.

Referring now to the drawings wherein like reference characters designate corresponding parts throughout the several views, there is shown in FIGS. 3–5 the steps involved in making a first form of the invention. As shown in FIG. 3, a substantially cylindrical rod 15 formed of mild steel which may be for example on the order of 5/16 inch in diameter is provided. Referring now to FIG. 4, one end portion 17 of member 15 is then flattened out by any suitable means, portion 17 comprising the support end portion of the cable holder while end portion 16 comprises the attachment end portion thereof. It will be understood that member 15 is readily deformable by suitable tools such as a pair of pliers or the like, and that support end portion 17 can readily be bent into the arcuate configuration as illustrated in phantom line in FIG. 5.

The cylindrical attachment end portion 16 is particularly useful with the conventional stud welding gun which generally employs a ceramic ferrule which is adapted to fit about such a cylindrical member. These circular ferrules are more readily available in stud welding gun equipment and accordingly this particular modification can be readily employed with components which are on hand. It should be understood that the flattened deformable end portion 17 may be either preformed into the arcuate configuration as indicated in FIG. 5, or the cable holder can first be welded into position on a support means and then the support end portion of the cable holder may be deformed into the arcuate configuration.

Referring now to FIGS. 1 and 2, a suitable support means such as a vertically extending bulkhead 20 formed of metal as employed in ships is illustrated. The cable holder is shown in its operative position wherein it has been welded by electric arc welding techniques to the support means 20 by means of a conventional stud welding gun or the like, the body of the weld being indicated by reference numeral 21.

In FIG. 2, it will be seen that the support end portion of the cable holder is firstly bent into an arcuate configuration such that the terminal end 23 thereof provides a throat portion with the remaining portion of the support end portion such that a cable 25 may be readily fitted into the support end portion through the open throat as shown.

After the cable is suitably supported in position as shown, the terminal end portion 23 may be bent into its final operative position as indicated by phantom line 23' wherein the cable 25 is positively prevented from being removed from the cable holder without firstly again deforming the terminal end portion 23 thereof outwardly into the full line position. The terminal end portion 23' can be tightly clamped against the cable as by crimping it with a suitable tool such as a pair of pliers or the like.

Referring now to FIG. 6, a modified form of the cable holder is illustrated wherein a flat bar-like member 30 formed of mild steel or the like is provided. When utilizing this type of member, the ceramic ferrule of the stud welding gun may be modified so as to fit snugly about the generally rectangular cross-sectional configuration of member 30 as will be well understood.

Referring now to FIG. 7, the member 30 is shown in operative position on a suitable vertically extending support means 31 such as the metallic bulkhead of a ship. The member 30 has been electrically arc welded to member 31, the body of the weld being indicated by reference numeral 32. The support end portion 35 of the cable holder has been bent into an arcuate configuration, it being understood that this arcuate configuration is preferably made after member 30 has been welded to support means 31 so as to enable the use of the conventional stud welding gun without any modifications thereof. On the other hand, arcuate portion 35 may be preformed in members 30 prior to welding member 20 to the support means 31.

It will be noted that the terminal end 37 of the arcuate portion 35 as shown in full line defines a throat portion which is adapted to receive the cable 40 as indicated in FIG. 8. After inserting the cable in operative position in the arcuate supporting end portion, the terminal end 37 is then crimped as by a pair of pliers or the like into the final position as indicated in phantom line 37' of FIG. 7 wherein it serves to clamp and retain the cable 40 in position such that it can not accidentally escape from the cable holder.

Referring now to FIG. 9, member 42 may represent a horizontally extending support member such as an overhead in a ship from which a cable holder 43 is supported in depending relationship. It will be understood that member 43 is identical with member 30 as shown in full lines in FIG. 7. In this particular application, the arcuately shaped support end portion 44 may be as shown in full lines in FIG. 7, and a cable 45 supported therein. When it is desired to utilize the cable holder merely as a more or less hanger member, the cable may be simply disposed in the arcuate end portion 44 without subsequently crimping the terminal end of the arcuate end portion into clamping relationship as described previously.

Referring now to FIG. 10, a deck member 50 or the like is illustrated wherein the cable supporting member indicated generally by reference numeral 51 extends vertically upwardly therefrom. The arcuate support end portion 52 of this cable holder is adapted to support a cable 53 therein, and it will be understood that the terminal end portion 54 of support end portion 52 is again crimped or bent into the final position as indicated by phantom line 37' in FIG. 7 so as to tightly clamp and retain the cable therein such that it can not accidentally fall out of the cable holder.

In each of the modifications herein illustrated, the support end portion and the attachment end portion have been shown as being integral with one another. It will of course be apparent that the support end portion and the attachment end portion may be formed as separate members if desired, the two members being suitably secured to one another in any desired manner. The support end portion may either be preformed in its arcuate shape as discussed previously, or it may be bent into its arcuate shape after the attachment end portion of the cable holder has been welded in operative position on a suitable support means. For example, it will be clearly understood that the cable holder as shown herein could obviously be modified so as to comprise a substantially cylindrical attachment portion to which may be suitably secured an arcuately shaped support portion which may be generally U-shaped or the like and which would incorporate a deformable terminal end portion which can be subsequently crimped into the operative position as discussed so as to positively retain the cable in operative position.

Additionally, if desired the outermost end of the attachment end portion may be provided with a suitable flux material so as to facilitate welding to a metallic support means.

It is apparent from the foregoing that there is provided a new and novel cable holder which is particularly adapted for use on ships or other installations having metallic surfaces since the attachment end portion of the cable holder is especially designed to be electrically arc welded as by use of a conventional stud welding gun to a metallic member. It is apparent that the structure of the cable holder according to the present invention represents the ultimate in simplicity, thereby reducing the cost of the installation to a minimum and furthermore providing a finished structure which is very sturdy and rugged and reliable in use.

A new and improved method is provided for making a cable holder according to the present invention, and furthermore, a simplified and expeditious method is provided for installing the cable holders and mounting the associated cables in supported position therein.

As this invention may be embodied in several forms without departing from the spirit or essential characteristics thereof, the present embodiment is therefore illustrative and not restrictive, and since the scope of the invention is defined by the appended claim, all changes that fall within the metes and bounds of the claim or that form their functional as well as conjointly cooperative equivalents are therefore intended to be embraced by the claim.

I claim:

A cable holder consisting solely of an integral, solid, one-piece, elongated body formed of mild steel and including an attachment end portion and an opposite cable support portion, said attachment end portion being an elongated solid portion having a longitudinal axis and being of uniform diameter throughout to define a substantially straight cylindrical outer surface up to and including the terminal end thereof, said terminal end of said attachment end portion being substantially flat for welding directly to a supporting means, said attachment end portion being disposed substantially perpendicular to the longitudinal axis of said attachment end portion, said support end portion extending in alignment with said attachment end portion and being flat and of substantially rectangular cross sectional configuration and of a length at least equal to the length of said attachment end portion, said support end portion having a constant thickness substantially less than the diameter of said attachment end portion and having a width substantially greater than the diameter of said attachment end portion, and said support end portion being bent into an arcuate configuration for clamping engagement with a cable supported therein, said attachment end portion and said support end portion being of substantially constant cross sectional area throughout the cable holder.

(References on following page)

References Cited by the Examiner

UNITED STATES PATENTS

| | | | |
|---|---|---|---|
| 661,604 | 11/00 | Grabler | 248—71 |
| 923,128 | 5/09 | Lachman | 219—107 |
| 1,109,568 | 9/14 | Flagge | 248—71 |
| 1,240,863 | 9/17 | Lyda | 248—224 X |
| 1,411,340 | 4/22 | Gail | 219—107 |
| 1,503,827 | 8/24 | Hall | 219—107 |
| 1,588,350 | 6/26 | Godwin | 248—71 |
| 2,104,831 | 1/38 | Dauskardt | 248—243 X |
| 2,396,241 | 3/46 | Besler et al. | 248—68 |
| 2,514,256 | 7/50 | Rachlin | 248—71 |
| 2,675,201 | 4/59 | Friel | 248—228 |
| 2,936,981 | 5/60 | Aversten | 248—74 |
| 2,990,150 | 6/61 | Weigel et al. | 248—68 |
| 3,120,938 | 2/64 | Lucas | 248—68 |

FOREIGN PATENTS

| | | |
|---|---|---|
| 775,650 | 5/57 | Great Britain. |
| 793,322 | 4/58 | Great Britain. |

CLAUDE A. LE ROY, *Primary Examiner.*